United States Patent [19]
Cusumano

[11] 3,882,644
[45] May 13, 1975

[54] DUST COLLECTOR FOR PORTABLE ROTARY DISC GRINDER

[75] Inventor: Guy F. Cusumano, Englishtown, N.J.

[73] Assignee: Clarkson Industries, Inc., New York, N.Y.

[22] Filed: May 24, 1974

[21] Appl. No.: 473,234

Related U.S. Application Data

[63] Continuation of Ser. No. 368,102, June 8, 1973, abandoned.

[52] U.S. Cl. ............................... 51/170 T; 51/273
[51] Int. Cl. ...................... B24b 23/02; B24b 55/06
[58] Field of Search ..... 51/170 T, 170 MT, 170 PT, 51/273

[56] References Cited
UNITED STATES PATENTS

| 2,156,824 | 5/1939 | Toro | 51/170 T |
|---|---|---|---|
| 2,789,404 | 4/1957 | Downing | 51/273 |
| 2,803,098 | 8/1957 | Downing | 51/273 |
| 2,819,571 | 1/1958 | Morgan | 51/273 |
| 2,954,653 | 10/1960 | Harvey | 51/170 T X |
| 3,594,958 | 7/1971 | Cusumano | 51/273 X |
| 3,826,045 | 7/1974 | Champagne | 51/273 X |

FOREIGN PATENTS OR APPLICATIONS

| 846,215 | 8/1952 | Germany | 51/170 T |
|---|---|---|---|
| 780,761 | 8/1957 | United Kingdom | 51/273 |
| 782,510 | 9/1957 | United Kingdom | 51/273 |

Primary Examiner—Donald G. Kelly

[57] ABSTRACT

A dust-extracting device for use in conjunction with a portable rotary flexible disc grinder comprising a truncated circular dust-extracting hood overlying somewhat more than half of the area of the disc and having an arcuate skirt extending downwardly nearly to the plane of the disc, a dust induction chamber formed at the end of the hood skirt toward which the disc turns, and an arcuate duct formed in the upper inner periphery of the hood. The dust induction chamber has mounted thereon a curved scoop positioned to guide air and dust particles toward the dust induction chamber. The device is provided with three series of holes, namely, a first series of holes in the front wall of the induction chamber, a second series of holes in the bottom of the induction chamber and a third series of holes in the bottom of the arcuate duct. The device provides effective dust collection with a relatively high ratio of air induction velocity to total quantity of air flow.

14 Claims, 4 Drawing Figures 3,882,644

DUST COLLECTOR FOR PORTABLE ROTARY DISC GRINDER

This is a continuation of application Ser. No. 368,102, filed June 8, 1973, now abandoned.

This invention relates to a novel suction-operated dust collector for collecting the dust generated by a portable grinding tool, for example, a flexible disc sander, as well as to a portable tool equipped with such a sander.

Flexible abrasive grinding discs are extensively used on portable grinders which are usually driven by compressed air motors, although they may also be driven by an electric motor or flexible shaft drive. Such disc grinders or sanders are employed, for example, for finishing the surfaces of metal or plastic objects and when so used generate considerable amounts of dust, largely composed of material removed from the work piece, but in part composed of particles of abrasive material removed from the grinding disc. Such dust particles, if uncontrolled, can be injurious to the health of the unprotected worker and, in some cases, represent a significant loss of valuable product.

Industrial hygiene researchers have shown that many respiratory diseases are caused and aggravated by exposure of the lung to dust in what is commonly referred to as the respirable range, which is generally accepted to be above about 0.05 microns in aerodynamic diameter to a maximum of possibly 10 microns in aerodynamic diameter. Thus it is particularly important to protect the tool operator against inhalation of dust particles within this size range.

In general, it has been found that the most efficient way of controlling the dust generated by such tools is to utilize a suction nozzle or a hood having a suction inlet close to the point of generation of the dust and thus produce a high velocity air stram which flows through the immediate area in which the dust is generated and conducts the dust to a filter or other suitable point of disposal. In order to operate such a device effectively the velocity of the air stream must be several times as great as the velocity imparted to the particles by rotation of the disc. Since a high speed sander disc may generate particles having an initial velocity of 10,000 feet per minute or more, relatively high air velocities are required to divert and capture the particles in such suction devices.

A further factor that must be taken into account is the fact that a certain proportion of the generated particles are carried around by the disc. Logically one might assume that particularly at speeds of the order of magnitude mentioned above the particles would be projected tangentially from their point of generation. However, it appears that most of the finer particles, which as pointed out above are particularly hazardous when inhaled, are captured by an air film adjacent to the surface of the wheel and carried part way or all the way around the wheel.

It is evident that in order to achieve the required suction air velocities it is ordinarily necessary to handle a considerable volume of air. The relationship between air velocity and volume of air depends upon the structure and configuration of the nozzle or hood which is used. From an economic standpoint it is desirable to minimize the quantity of air used in order to minimize the size and power requirements of the pump or exhauster employed to create the requisite reduced pressure upstream of the suction nozzle or hood.

Numerous types of suction nozzles and hoods have been previously proposed for removal of dust particles from grinding or sanding operations. One such device is shown in Harvey U.S. Pat. No. 2,954,653. The dust extractor shown in this patent comprises a trapezium-shaped nozzle mounted on the housing of the driveshaft for the grinding disc. The nozzle has two adjacent slotted edges, one of which confronts the area of generation of the dust, the other of which is displaced circumferentially from the dust generation area of the wheel in the direction of rotation of the wheel.

While such devices have been found to be reasonably effective dust collectors, they are subject to a number of disadvantages. Thus in order to achieve the requisite air intake velocities with a slotted edge nozzle of the type shown in this patent, it has been found that an undesirably large volume of air must be handled. While the volume of air inducted into the slot could be reduced by decreasing the height of slot, such a measure would also reduce the ability of the nozzle to accept the larger particles generated in the grinding operation. Also as pointed out above, a certain amount of the fine dust is carried around with the wheel and such dust can escape to the atmosphere at points beyond the nozzle. Moreover, such devices have an undesirably high noise level. In addition, it is occasionally necessary for the operator to use the rear portion of the wheel, and in such cases the device of this patent is ineffective as a dust collector.

It is accordingly an object of the present invention to provide an improved dust collector for a portable rotary disc sander. It is another object of the invention to provide an effective suction-type dust collector having a relatively high ratio of air velocity to air volume. It is still another object of the invention to provide a suction-type dust collector that operates at a relatively low noise level. It is a still further object of the invention to provide a dust collector for a disc sander that permits use of the back of the disc when required, and reduces the escape of dust to the atmosphere during such use. It is still another object of the invention to provide a dust collector that picks up a relatively high proportion of the larger particles. Other objects of the invention will be in part obvious and in part pointed out hereinafter.

The many objects and advantages of the present invention can best be understood and appreciated by reference to the accompanying drawings which illustrate a preferred embodiment of the invention and wherein FIG. 1 is a top perspective view of the body portion of the sander and dust collector showing the general relationship between the parts;

Figure 1:
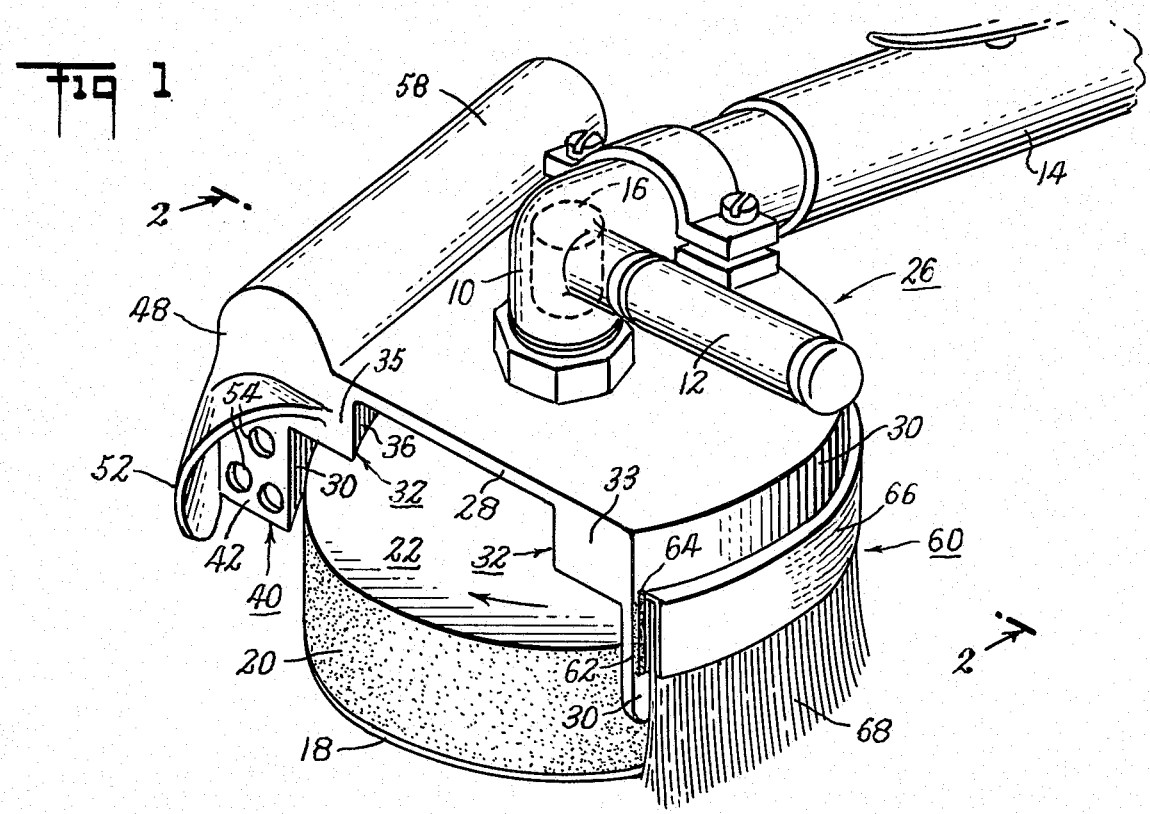
Figure 2:
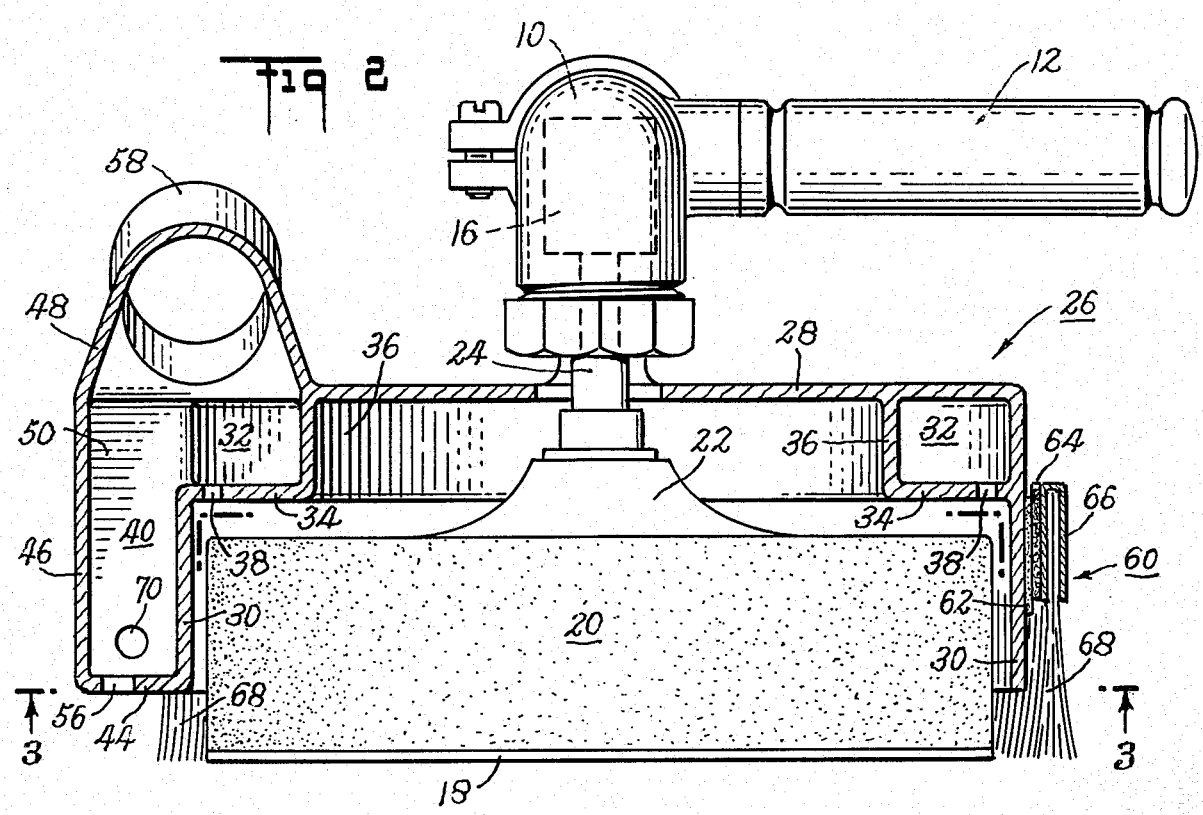
FIG. 2 is a section taken on the line 2—2 of FIG. 1 showing the cushion wheel mounting of the sander disc and portions of the internal structure of the dust collecting hood.

Referring to the drawings and particularly to FIGS. 1 and 2, the portable rotary sander comprises a body portion 10 having the handles 12 and 14 and containing an air-actuated motor 16 for rotating the sander disc. Compressed air to actuate the motor is supplied through the handle 14. Referring particularly to FIG. 2, a sander disc 18 is secured by a suitable adhesive to backing pad 20 made of foamed rubber or plastic that permits the disc to flex readily. The pad 20 is adhered to the adapter 22 which in turn is secured to the drive shaft 24 which is rotated by motor 16. The axis of shaft 24 is aligned with the center of disc 18. The sander per se is of conventional construction.

In order to prevent dust generated during operation of the sander, and particularly the respirable portions of the dust, from escaping to the atmosphere, the sander is partially encased in a truncated circular hood generally indicated by the numeral 26 and comprising the top plate 28 and arcuate skirt 30 which extends downwardly along the sides of the backing pad to a point just above the disc 18. As best shown in FIG. 1, the hood overlies somewhat more than half of the area of the sander disc, thus leaving the front portion of the backing pad and sander disc exposed.

It should be noted parenthetically that for convenience, the sander and dust collector are described and claimed herein as if they were resting on a horizontal surface. It will, of course, be understood that the sander is normally tilted forwardly somewhat and occasionally backward when working on horizontal surfaces, and may also be used on vertical surfaces or surfaces having other orientations.

At the upper inner periphery of the hood 26 there is an arcuate duct 32 of rectangular cross-section defined by the horizontal wall 34, vertical wall 36 and the adjacent portions of the hood 26. The duct 32 is closed at its ends 33 and 35 (see FIG. 1) and the horizontal wall 34 thereof is provided, as best shown in FIG. 3, with a series of spaced relatively small holes 38.

Referring to FIGS. 1 and 2, the left-hand side of these Figures show the dust induction chamber 40 defined by a portion of the skirt 30, the front wall 42, bottom wall 44, side wall 46, curved convex top wall 48 and (see FIG. 4) rear wall 50. The front wall 42 of chamber 40 has secured thereto a curved scoop 52 extending forwardly in a direction opposite that to the direction of rotation of disc 18. Front wall 42 is provided with a series of relatively large holes 54. As further described below, air at high velocity is drawn through the holes 54 into the dust induction chamber and carries with it much of the dust generated by operation of the sander. the scoop 52 serves to guide dust-laden air toward the holes 54.

Figure 3:
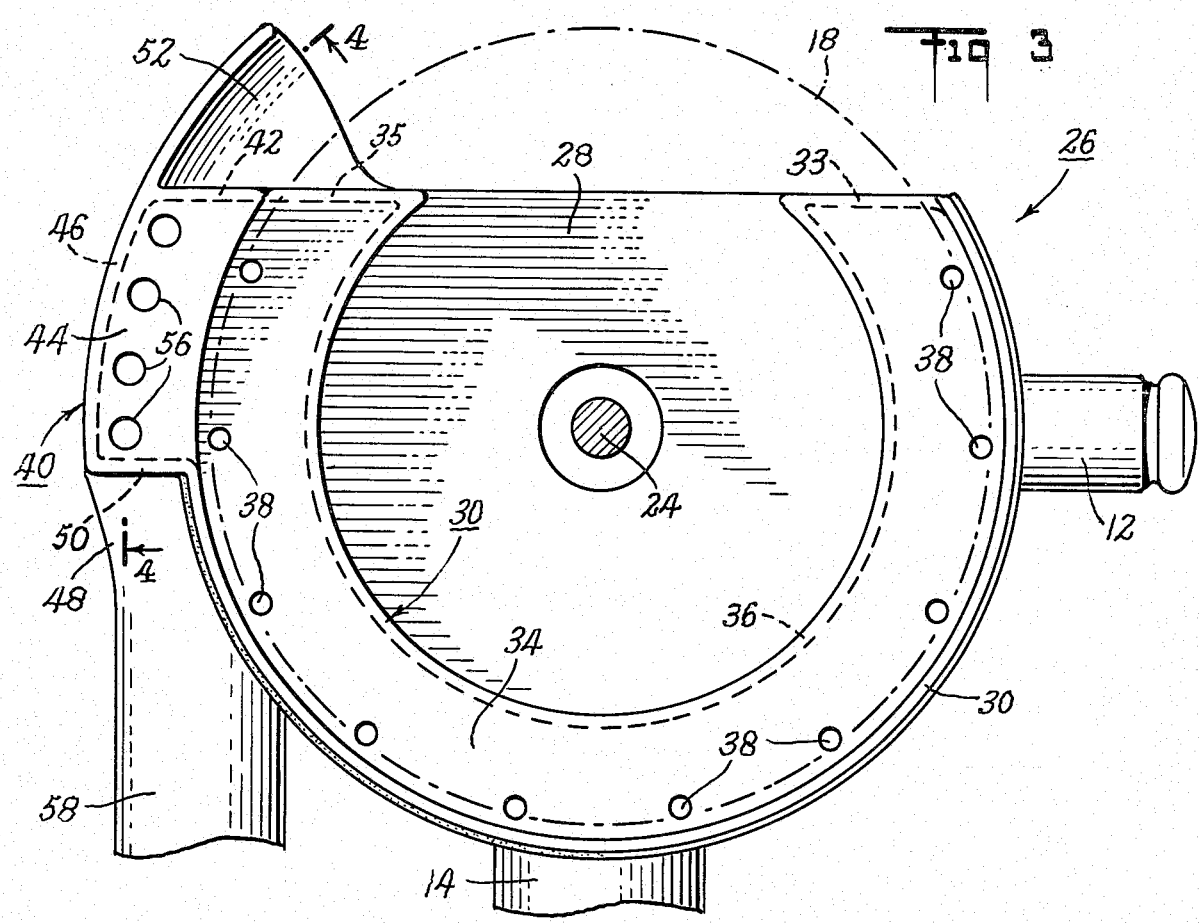
FIG. 3 is a section taken on the line 3—3 of FIG. 2, i.e., it is essentially a bottom plan view of the dust collecting hood showing the spaced holes in the arcuate internal channel of the hood and the holes in the bottom of the dust induction chamber.
Figure 4:
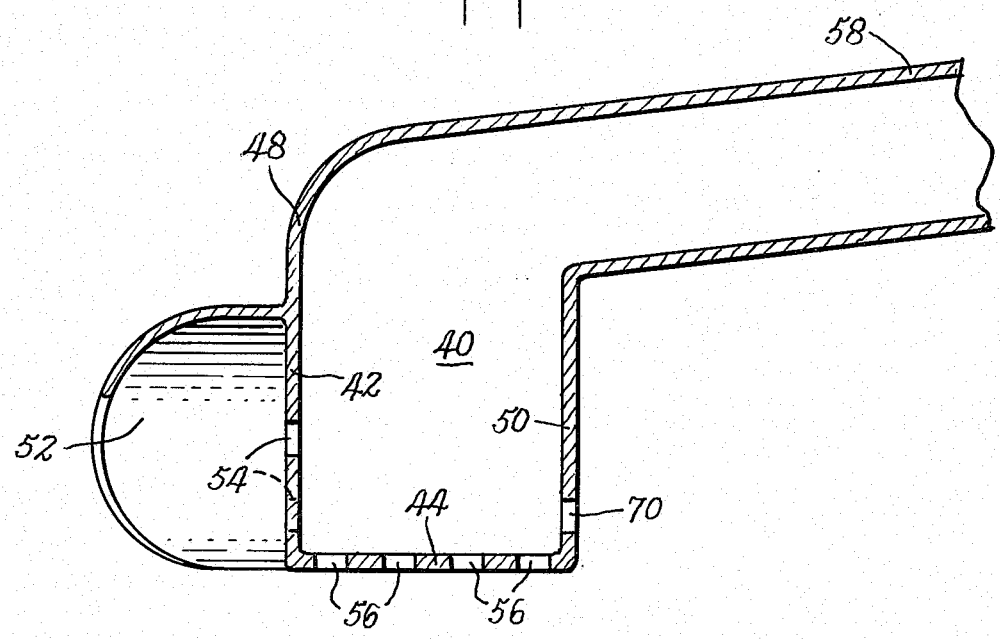
FIG. 4 is a section taken on the line 4—4 of FIG. 3 showing the interior of the dust induction chamber, its associated scoop and the connection of the suction conduit to the chamber.

Referring to FIGS. 2, 3 and 4, the bottom wall 44 of the air induction chamber is provided with a series of relatively large holes 56 through which air at high velocity is drawn in a manner described below. Air drawn through holes 56 entrains dust particles that would otherwise pass below the bottom wall 44 of chamber 40.

As best shown in FIG. 2, the channel 32 is broken away at the portion of its periphery where the air induction chamber is located to provide free communication between the interior of the chamber and the duct. The upper wall 48 of the dust induction chamber merges into a tubular suction conduit 58.

The suction conduct 58 is connected to a suitable and conventional suction-generating exhauster. Thus it may be connected to a flexible hose leading to a filter or other dust-collecting means, which in turn is connected to the suction side of an exhauster or other suitable means of producing a reduced pressure in the suction conduit 58. Since any suitable and wellknown means of producing a reduced pressure in suction conduit 58 can be employed, these parts are not shown in the drawing.

The operation of the apparatus so far described is as follows:

The motor 16 of the head 10 of the sander is supplied with compressed air through the handle 14, and through shaft 24, adapter 22 and backing pad 30 rotates the sander disc 18 in the direction indicated by the arrow in FIG. 1. The lower surface of the sander disc 18 is pressed against the work-piece by the operator and during this operation dust particles having a relatively wide range of particle sizes are generated. The connection of suction tube 58 to a conventional exhauster produces a flow of high velocity air through the openings 54 and 56 of the dust induction chamber 40. A high proportion of the larger particles, as well as a substantial proportion of the smaller particles are drawn into the air induction chamber 40 in this way. By using the holes 54 and 56 in the dust induction chamber rather than the slots previously used, the total amount of air drawn into the chamber for a given high velocity flow in the area where the particles are generated is less than that required with the slotted nozzles of certain of the prior art devices. As pointed out above, the scoop 52 helps in guidng the dust-bearing air stream toward the holes 54. Dust particles that are projected below chamber 40 are drawn thereinto through the holes 56 in the bottom wall 44.

As described above, a certain proportion of the fine particles are carried around with the wheel. As the wheel rotates under hood 26 these fine particles are captured by air streams flowing through the holes 38 in the bottom of the arcuate duct 32. The hood 26 cooperates with the rotating disc and backing pad to direct the flow of air generated by rotation of the disc and pad to enhance the effectiveness of the dust pick-up by holes 38. By using a series of relatively small holes in the duct 32, high velocity air streams for capturing the fine dust drawn under the hood by rotation of the disc can be effectively achieved with only a relatively small volume of air. The three series of holes 54, 56 and 38 cooperate to carry a high proportion of both the large and small dusts particles into the induction chamber 40 and duct 32 and thence through the suction nozzle 58 away from the hood.

Reverting now to FIGS. 1 and 2, the skirt 30 of hood 26 is provided with an arcuate brush 60. More particularly, the brush comprises cooperating strips 62 and 64 of a hook-and-eye synthetic pile connector material, which may be, for example, Velco connector material, the strip 62 being secured to the outside of the skirt 30 and the cooperating strip 64 of connector material being secured to the bristle-retaining band 66 in which the bristles 68 of the brush are held. The use of the cooperating strips 64 and 66 of the connector material permits the brush to be readily removed from the hood and attached thereto and also permits the brush to be readily adjusted vertically in relation to the sander disc 18.

The brush normally functions to prevent the escape to the atmosphere of dust particles which may be carried under the hood by rotation of the sander disc. The lower edge of the brush is desirably positioned in contact with the work-piece, i.e., below the plane of disc 18, during the normal operation of the sander. The brush is especially useful in the few cases where the operator may wish to use the back portion of the sander disc, since it tends to prevent escape of dust under these conditions.

Referring now particularly to FIG. 4, as the dustbearing air flows at a high velocity into the induction chamber 40 through the openings 54 and 56, there is a tendency for the particles to abrade the rear wall 50 of the induction chamber. It has been found that this tendency to abrade the wall 50 can be reduced the providing a hole 70 in the wall 50. Inflow of air through hole 70 diverts the main air stream to some extent and thereby reduces the erosive effect of the dust-laden air stream on the chamber wall.

From the foregoing description it should be apparent that the present invention provides a portable rotary sander and dust collector assembly capable of achieving the several objects set forth at the beginning of the present specification. By using a dust induction chamber having holes close to the point of generation of the dust instead of a slot and by using an arcuate duct having relatively small holes to collect the portion of fine dust particles carried around by the wheel, effective dust capture and removal can be achieved at a relatively high ratio of air velocity to air quantity, and the energy consumption of the dust removal operation reduced. Also the flexible hose interconnecting the suction conduit and dust filter may have a smaller diameter for a given size of tool or the same diameter for a larger size tool. Moreover, it has been found that the noise level of the dust collector is reduced by using the present invention. The construction of the dust collector is such that the back portion of the sander disc can be used if desired, and when so used, the brush 60 limits the escape of dust to the atmosphere.

In certain types of compressed air driven rotary grinders the air used to drive the motor is discharged downwardly from the body portion 10. When the hood 26 is used in conjunction with such grinders, the top 28 of hood 26 serves to divert the flow of such discharged air away from the grinding wheel or disc.

It is, of course, to be understood that the foregoing description is intended to be illustrative only and numerous changes can be made in the specific embodiment described without departing from the scope of the invention as defined in the appended claims. Thus the sander disc 18 or other grinder disc may be mounted for rotation by motor 16 in a variety of known ways. For example, the backing pad may be made relatively thin, and the disc secured to adapter 22 by a screw extending through the backing pad and threaded into the center of the adapter. Also the center of disc 18 may be off-set from the axis of shaft 24 to provide a known "random orbit" movement of the disc. Other modifications within the scope of the claims will be apparent to those skilled in the art.

I claim:

1. A portable rotary grinder having a body portion, a thin flexible abrasive disc, a drive shaft effectively secured to the center of said disc and extending into said body, motor means within said body connected to rotate said shaft and disc, a truncated circular dust-extracting hood positioned between said disc and body portion and overlying somewhat more than half the area of said disc, said hood including an arcuate skirt extending downwardly nearly to the plane of said disc, an arcuate duct formed at the upper inner periphery of said hood and circumferentially coextensive therewith, a dust induction chamber formed on the outside of the end of said skirt toward which said disc turns and communicating with said duct, said chamber having a front wall with a first series of holes formed therein, a curved scoop secured to the front wall of said chamber and extending in a direction opposite to the direction of rotation of said disc to guide dust particles generated by operation of said grinder toward said first series of holes, the bottom wall of said chamber being provided with a second series of holes, and the bottom wall of said duct being provided with a third series of holes spaced along the length thereof, and a suction conduit connected to said hood near said chamber and communicating with the interiors of said chamber and said duct, whereby dust particles generated during operation of said grinder are drawn through said several series of holes and away from said hood.

2. A portable grinder according to claim 1 wherein said duct and the skirt of said hood subtend an angle of 200° to 270° at the axis of said grinder.

3. A portable grinder according to claim 1 wherein the skirt of said hood has secured thereto an arcuate brush extending downwardly below the plane of said disc.

4. A dust-extracting device adapted to be used in conjunction with a motor-driven, rotary, flexible disc grinder to collect dust formed during operation of said grinder, said dust extracting device comprising a truncated circular dust-extracting hood positioned between said motor and disc and overlying somewhat more than half the area of said disc, said hood including an arcuate skirt extending downwardly nearly to the plane of said disc, a dust induction chamber formed at the end of said skirt toward which said disc turns, said chamber having a front wall with a series of holes formed therein, a curved scoop secured to the front wall of said chamber and extending in a direction opposite to the direction of rotation of said disc to guide dust particles generated by operation of said grinder toward said holes in said chamber front wall, said chamber having a bottom wall with a second series of holes formed therein, and a suction conduit connected to said chamber, whereby air and dust particles formed during operation of said grinder are drawn through said holes and away from said hood.

5. A dust-extracting device adapted to be used in conjunction with a motor-driven, rotary, flexible disc grinder to collect dust formed during operation of said grinder, said dust extracting device comprising a truncated circular dust-extracting hood positioned between said motor and disc and overlying somewhat more than half the area of said disc, said hood including an arcuate skirt extending downwardly nearly to the plane of said disc, an arcuate duct formed at the upper inner periphery of said hood and circumferentially coextensive therewith, said duct having a bottom wall provided with a first series of holes spaced along the length thereof, a dust induction chamber formed on the outside of the end of said skirt toward which said disc turns, said chamber having a front wall with a second series of holes formed therein, a curved scoop secured to the front wall of said chamber and extending in a direction opposite to the direction of rotation of said disc to guide dust particles generated by operation of said grinder toward said holes in said chamber front wall, said chamber having a bottom wall with a third series of holes formed therein, and a suction conduit connected to and communicating with said chamber and duct, whereby air and dust particles formed during operation of said grinder are drawn through said holes and away from said hood.

6. A dust-extracting device according to claim 5 wherein the holes of said first series are of smaller diameter than the holes of said second and third series.

7. A dust-extracting device adapted to be used in conjunction with a motor-driven, rotary, flexible disc grinder to collect dust formed during operation of said grinder, said dust-extracting device comprising a truncated circular dust-extracting hood positioned between said motor and disc and overlying somewhat more than half the area of said disc, said hood including an arcuate skirt extending downwardly nearly to the plane of said disc, an arcuate brush mounted on the skirt of said hood and extending downwardly below the plane of said grinder disc, a dust induction chamber formed on the outside of the end of said skirt toward which said disc turns, said chamber having a front wall with a series of holes formed therein, a curved scoop secured to the front wall of said chamber and extending in a direction opposite to the direction of rotation of said disc to guide dust particles generated by operation of said grinder toward said holes in said chamber front wall, said chamber having a bottom wall with a second series of holes formed therein, and a suction conduit connected to said chamber, whereby air and dust particles formed during operation of said sander are drawn through said holes and away from said hood.

8. A dust-extracting device adapted to be used in conjunction with a motor-driven rotary grinder to collect dust formed during operation of said grinder, said dust-extracting device comprising a truncated, circular dust-extracting hood adapted to be positioned between said motor and disc and to overlie said disc, said hood including a dependent arcuate skirt, a dust induction chamber formed at one end of said skirt, said chamber having a front wall substantially perpendicular to said skirt, said wall having a series of holes formed therein and being positioned to receive dust particles generated by operation of said grinder, a scoop mounted on said induction chamber and extending circumferentially of said hood, said scoop being constructed and arranged to guide dust particles generated by operation of said grinder toward said holes in said chamber, and a suction conduit connected to said chamber for drawing air and dust particles formed during operation of said grinder through said chamber and away from said hood.

9. A dust-extracting device according to claim 8 wherein said dust induction chamber has a bottom wall with a second series of holes formed therein.

10. A dust-extracting device according to claim 8 wherein said hood has an arcuate duct formed at the upper inner periphery thereof, said duct having a bottom wall provided with a series of holes spaced along the length thereof.

11. A dust-extracting device according to claim 8 wherein the skirt of said hood subtends an angle of 200° to 270° at the axis of said grinder.

12. A dust-extracting device according to claim 8 wherein said chamber has a rear wall with a hole formed therein through which air is drawn to reduce erosion of said wall by the stream of dust-bearing air passing through said chamber.

13. A dust-extracting device adapted to be used in conjunction with a motor driven rotary grinder to collect dust formed during operation of said grinder, said dust-extracting device comprising a truncated circular dust-extracting hood adapted to be positioned between said motor and disc and to overlie said disc, said hood including a depending arcuate skirt a dust induction chamber formed at one end of said skirt, said chamber having a front wall substantially perpendicular to said skirt, said wall having a series of holes formed therein and being positioned to receive dust particles generated by operation of said grinder, an arcuate brush mounted on the skirt of said hood and extending downwardly therefrom and a suction conduit connected to said chamber for drawing air and dust particles formed during operation of said grinder through said chamber and away from said hood.

14. A dust-extracting device according to claim 13 wherein said arcuate brush is vertically adjustable with respect to the skirt of said hood.

* * * * *